United States Patent [19]

Rosenfeldt

[11] 4,388,572

[45] Jun. 14, 1983

[54] CONSTANT SPEED REGULATOR FOR DC MOTORS

[75] Inventor: Wolfgang Rosenfeldt, Bad Bergzabern, Fed. Rep. of Germany

[73] Assignee: Sybron Corporation, Rochester, N.Y.

[21] Appl. No.: 150,051

[22] Filed: May 15, 1980

[51] Int. Cl.³ .............................................. H02P 5/16
[52] U.S. Cl. .................................. 318/317; 318/345 B
[58] Field of Search ............... 318/345 CA, 341, 317, 318/345 B; 363/46; 323/351

[56] References Cited

U.S. PATENT DOCUMENTS 2,977,523  3/1961  Cockrell ...................... 318/345 CA
3,486,104  12/1969  Epstein .................................. 363/46
3,600,663  8/1971  Wagner ................................... 363/46
3,947,752  3/1976  Morgan .............................. 323/22 T Primary Examiner—David Smith, Jr.
Attorney, Agent, or Firm—Robert A. Gerlach; Joseph C. MacKenzie

[57] ABSTRACT

An electric motor is supplied a voltage from a control circuit. The control circuit is powered by an AC to DC rectifier having a shunt capacity. An increase in motor load will result in lower speed and an increase in current. This causes an increase in AC ripple across the shunt capacitor. The control circuit is responsive to the AC ripple and increases voltage to the motor so that the speed set before the application of load is again attained.

1 Claim, 2 Drawing Figures

CONSTANT SPEED REGULATOR FOR DC MOTORS

BACKGROUND OF THE INVENTION

This invention pertains to speed regulators for direct current DC motors and, more particularly, is concerned with open loop speed regulators for DC motors.

DC motors find numerous applications because of their intrinsic variable speed characteristics and capabilities which offer very high speeds and small size.

The rotating member of a DC motor is named the armature and the stationary member is named the field. The armature has windings and the field can have either windings or permanent magnets.

Some applications have a need for constant speed regardless of torque. A general statement about DC motors is that with an increase in torque, speed will drop and current will increase, assuming a constant input voltage. The amount each parameter varies depends on the type of motor. For a motor with the armature and field winding connected in series the drop in speed will be more pronounced than the increase in current. For motors with shunt connected windings or permanent magnet fields the opposite is true, the speed will be more nearly constant while there is a marked increase in current. There will be some drop in speed however, and this amount may be undesirable in critical applications. For this reason, a number of constant speed controls have been devised over the years.

Speed regulating systems may be classified as either closed loop or open loop. Closed loop systems derive a signal from the actual speed of the motor with a tachometer, for example, and use the signal in a feedback loop.

An open loop system does not measure speed directly but measures some other parameter. In some open loop systems the measured parameter is current.

A well known example of an open loop motor regulating system includes a resistor in series with the input of the motor. The voltage across the resistor corresponds to motor current and is directed to a control circuit. The resistor voltage influences a control circuit which supplies the input voltage to the motor. A change in resistor voltage indicates a change in torque and indirectly indicates a change in speed. In response to the resistor voltage the control circuit adjusts the voltage to the motor thereby supplying the right amount of power required to maintain a constant speed over variations in torque.

The series resistor causes $I^2R$ power losses particularly when during high torque conditions because current is high. These losses cause heat build-up and a need for a larger power supply capability.

It will be seen that a speed regulator according to the present invention does not require a resistor in series with the motor and is thereby more efficient.

SUMMARY OF THE INVENTION

An electric motor is supplied a voltage from a control circuit. The control circuit is powered by an AC to DC rectifier having a shunt capacity. An increase in motor load will result in lower speed and an increase in current. This causes an increase in AC ripple across the shunt capacitor. The control circuit is responsive to the AC ripple and increases voltage to the motor so that the speed set before the application of load is again attained.

DESCRIPTION OF THE INVENTION

Figure 1:
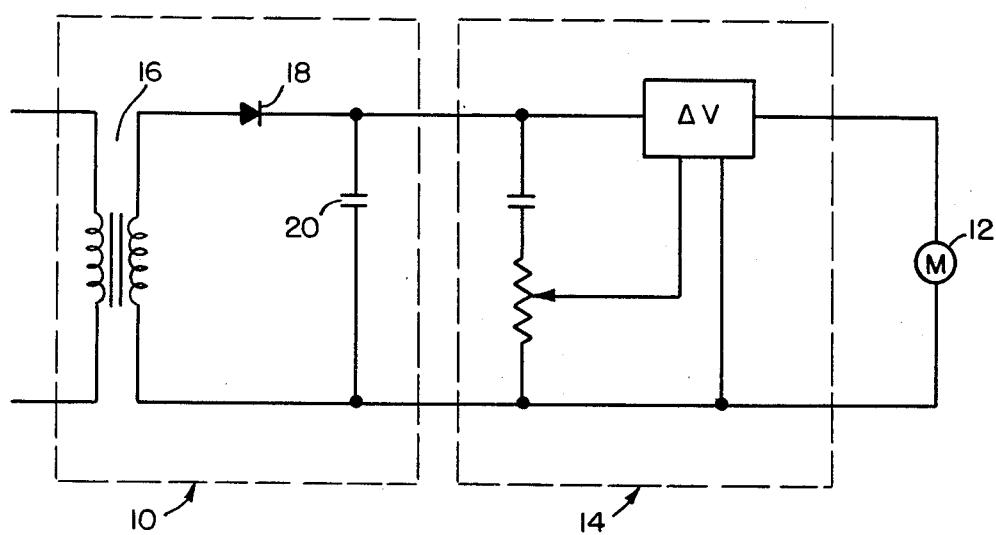
FIG. 1 is a block diagram, a motor speed regulator according to the invention.

Turning first to FIG. 1, there is seen a block diagram of a speed regulator embodying the invention. The circuitry is shown in more detail in FIG. 2.

A rectifying circuit 10 converts AC line voltage to direct current to power a DC motor 12. Interposed between rectifier circuit 10 and motor 12 is control circuit 14 which adjusts the input voltage to the motor to maintain a substantially constant speed regardless of variations of torque.

Rectifying circuit 10 includes a voltage transformer 16, a series diode 18, and shunt capacitor 20. The diode 18 rectifies the output of transformer 16. Capacitor 20 smooths the rectified voltage. At no load conditions the voltage across the capacitor is constant. When current flows under load conditions, the voltage across the capacitor has both a DC and AC component. The AC component is known as ripple, and depends on the size of the capacitor and the amount of current. The ripple increases with current. As a feature of the invention, the AC voltage across the capacitor is used as a control parameter to maintain a constant motor speed.

Reflecting upon what occurs when the motor must turn against an increase in torque, we recall that speed drops and current increases. The increase in current causes an AC component or ripple to appear across capacitor 20.

Under low torque conditions, the voltage across capacitor 20 is nearly all DC with little AC component. At higher torque conditions current is drawn from capacitor 20 and the ripple becomes higher.

Since speed is not measured directly as in a closed loop system, the control circuit must be designed with considerations of the motor's load characteristics. Starting from a normally low torque situation, the torque ripple relationship determines the amount of additional input voltage necessary to offset the speed slowing effects of applied torque.

Control circuit 14 increases the input current to motor 12 in response to the AC ripple.

Figure 2:
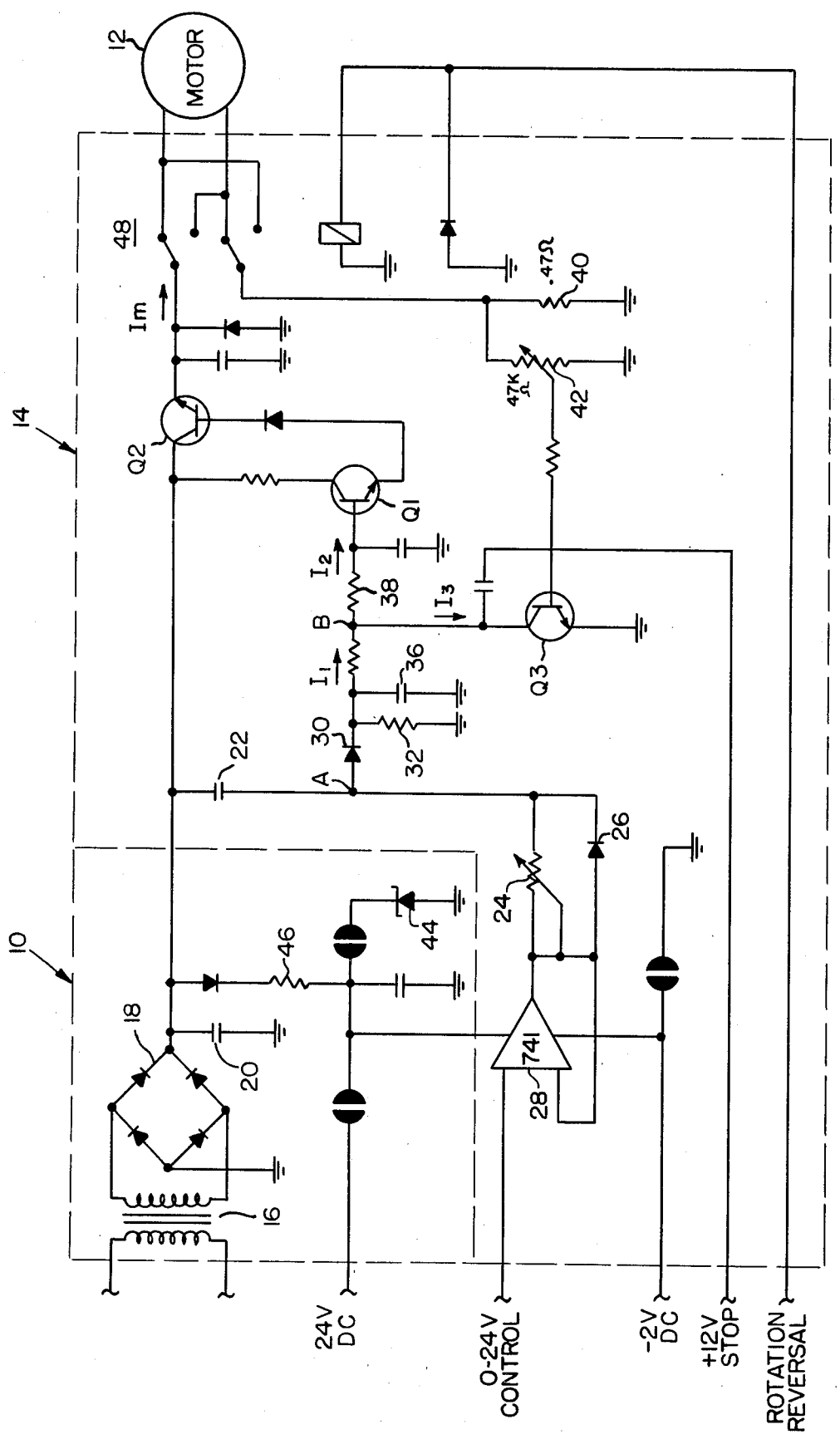
FIG. 2 is a schematic of the control circuit of the system of FIG. 1.

A suitable control circuit for use with a high speed permanent magnet motor is shown in the schematic of FIG. 2. This is the preferred circuit but those skilled in the art will be aware that other circuits could also give good results.

Diode 18 is seen as a full wave diode bridge followed by shunt capacitor 20 to provide direct current. High current conditions partially discharge capacitor 20 causing a AC ripple on the direct current. Capacitor 22 is connected to capacitor 20. DC voltage is blocked by capacitor 22 but the AC ripple is passed to ground through resistor 24, diode 26 and the low output impedance of operational amplifier 28. An AC voltage representing ripple is at node A of control circuit 14.

The desired motor speed is set by a DC control voltage buffered by the operational amplifier 28. The operational amplifier is arranged as a voltage follower with unity gain. The output bypasses resistor 24 by means of diode 26 so the DC control voltage appears at node A with the AC ripple previously described.

Diode 30 is connected to node A and rectifies the composite DC and AC voltage. Resistors, such as 32 and 38, and capacitors, such as 36, filter the rectified voltage so that a DC current, I, representing the sum of the DC control voltage and the ripple voltage, flows into node B.

Three NPN transistors Q1, Q2 and Q3 are arranged in a circuit similar to a conventional series voltage regulator. Q2 is in a series pass configuration and functions as a variable series resistor between the DC supply from capacitor 20 and motor 12.

The collector-emitter resistance of Q2 is controlled by Q1 which drives Q2's base.

Q3 is arranged to shunt part of I1, from node B, functioning as a variable current divider, wherein I1, flows into node B, I2 flows from node B to the base of Q1 and I3 flows from node B through Q3. The amount of current division is dependent upon the voltage at Q3's base.

When the circuit is first turned on, Q1, Q2 and Q3 are off and there is no ripple. I1 which represents control voltage, flows into the base of Q1, which in turn causes Q2 to pass current Im to motor 12 and resistors 40, 42. Because of the low value of resistor 42 the loss due to shunt resistors 40, 42 is minimal.

Under low torque conditions AC ripple will be small and the input voltage to motor 12 will be a function of control voltage. The feedback arrangement of Q3 maintains this voltage regardless of fluctuations in line voltage. Q3 senses the voltage drop across resistor 40 and draws current I3 which reduces I2 if Im increases. This tends to keep the motor voltage constant.

The circuit will reach equilibrium where both the motor current Im and voltage will hold constant.

When the motor is called upon to supply higher torque the corresponding increase in current Im drains capacitor 20 causing ripple, which as explained is seen as an increase of current I1 flowing into node B. This increases current flow I2 to the base of Q1 with the end result being that input voltage to the motor is increased to maintain a constant speed. Motor current Im also increases somewhat but the feedback arrangement of Q3 prevents a runaway condition.

The control circuit 14 adjusts the motor input voltage in response to ripple and control voltage. The input voltage is substantially free of normal line fluctuations. Thus the speed of the motor can be set and maintained regardless of torque or line voltage.

As another feature of the invention, the motor may be quickly stopped by application of voltage to the base of Q3. Q3 then conducts all the current from node B so that the resistance of series pass transistor Q2 becomes high shutting off voltage to the motor 12.

In keeping with the invention a DPDT relay 44 is provided at the input of motor 12 so the polarity of the input voltage can be reversed thereby changed the direction of rotation. Supply voltage for the operational amplifier 28 is derived from a zener diode 46 connected to unregulated dc through series resistor 48.

I claim:

1. An open loop speed regulator for use with a direct current motor comprising:
   an AC to DC rectifier circuit including a shunt capacitor;
   means for measuring AC ripple across the capacitor;
   a control circuit for supplying a variable magnitude DC input voltage to a DC motor, the control circuit being connected to said rectifier circuit and being responsive to the magnitude of AC ripple across the capacitor so as to increase the magnitude of DC input voltage to the DC motor as a function of increase of the magnitude of AC ripple.

* * * * *